(12) United States Patent
Heiss et al.

(10) Patent No.: US 8,452,841 B2
(45) Date of Patent: May 28, 2013

(54) TEXT CHAT FOR AT-RISK CUSTOMERS

(75) Inventors: Eric R. Heiss, Kennett Square, PA (US); Scott C. Huie, Charlotte, NC (US); Maria E. Kaj, Castro Valley, CA (US)

(73) Assignee: Bank of America Corporation, Charlotte, NC (US)

( * ) Notice: Subject to any disclaimer, the term of this patent is extended or adjusted under 35 U.S.C. 154(b) by 588 days.

(21) Appl. No.: 12/335,634

(22) Filed: Dec. 16, 2008

(65) Prior Publication Data
US 2010/0153502 A1 Jun. 17, 2010

(51) Int. Cl.
*G06F 15/16* (2006.01)
*G06Q 40/00* (2012.01)

(52) U.S. Cl.
USPC ............................ 709/206; 705/42

(58) Field of Classification Search
USPC .............................................. 709/206
See application file for complete search history.

(56) References Cited

U.S. PATENT DOCUMENTS

| | | | |
|---|---|---|---|
| 7,103,556 B2 * | 9/2006 | Del Rey et al. | 705/36 R |
| 7,315,837 B2 * | 1/2008 | Sloan et al. | 705/36 R |
| 7,346,492 B2 * | 3/2008 | Shaw | 704/9 |
| 7,433,855 B2 * | 10/2008 | Gavan et al. | 706/47 |
| 7,577,601 B1 * | 8/2009 | Rademacher et al. | 705/36 R |
| 7,620,596 B2 * | 11/2009 | Knudson et al. | 705/38 |
| 8,271,336 B2 * | 9/2012 | Mikurak | 705/22 |
| 2003/0055765 A1 * | 3/2003 | Bernhardt | 705/36 |
| 2003/0065613 A1 * | 4/2003 | Smith | 705/38 |
| 2004/0078340 A1 * | 4/2004 | Evans | 705/64 |
| 2004/0230527 A1 * | 11/2004 | Hansen et al. | 705/40 |
| 2004/0267660 A1 * | 12/2004 | Greenwood et al. | 705/38 |
| 2005/0144143 A1 * | 6/2005 | Freiberg | 705/75 |
| 2006/0041505 A1 * | 2/2006 | Enyart | 705/40 |
| 2007/0220010 A1 | 9/2007 | Ertugrul et al. | |
| 2007/0233594 A1 * | 10/2007 | Nafeh | 705/37 |
| 2007/0282744 A1 | 12/2007 | Barnes et al. | |
| 2008/0021816 A1 * | 1/2008 | Lent et al. | 705/38 |
| 2008/0021822 A1 * | 1/2008 | Hinton et al. | 705/40 |
| 2008/0065520 A1 | 3/2008 | Hazlehurst et al. | |
| 2009/0271287 A1 * | 10/2009 | Halpern | 705/26 |
| 2009/0307612 A1 * | 12/2009 | Singh et al. | 715/758 |

OTHER PUBLICATIONS

"Timpani for Telecommunications Providers" solutions.liveperson.com/docs/datasheets/LP_Vertical_Telco.pdf.
International Search Report for International Application PCT/US09/67188.

* cited by examiner

*Primary Examiner* — Kenny Lin
*Assistant Examiner* — Guang Li
(74) *Attorney, Agent, or Firm* — Weiss & Arons LLP; Michael A. Springs, Esq.

(57) ABSTRACT

Apparatus and methods for supporting text chat for at-risk customers are provided. A method for operating an electronic information processing platform may include receiving, via the electronic information processing platform, information indicating that a customer exhibits behavior indicative of a desire to terminate a relationship with an entity. The method may further include, transmitting to the customer a text chat invitation, via the electronic information processing platform, in response to the received information.

8 Claims, 3 Drawing Sheets

TEXT CHAT FOR AT-RISK CUSTOMERS

FIELD OF TECHNOLOGY

Aspects of the disclosure relate to systems and methods for supporting initiatives to limit attrition of at risk customers.

BACKGROUND

Text chat is currently an emerging customer service contact channel. This contact channel is being used across various service industries.

Most companies that deploy text chat utilize a vendor solution. These vendor products (like LivePerson's™ timpani) have the capability of using business rules to determine whether or not to offer a chat invitation to a customer navigating through the website.

Typically, the business rules are related- to customer types, location within the website, or online behaviors (such as time spent on a specific page).

It would be desirable to formulate a set of rules to determine whether a current customer navigating through an entity website is in danger of terminating his or her relationship with the entity.

It would be further desirable that the rules identify particular online customer behaviors that show the customer to be at-risk for terminating his or her relationship with the entity.

SUMMARY OF THE INVENTION

A method for initiating text chat for at-risk customers has been provided. The method may include using an electronic information processing platform.

The method may further include the steps of monitoring a customer's online website navigation at an entity's website to determine whether the customer's online website navigation exhibits a characteristic indicative of a potential termination of the relationship between the customer and the entity. The method may also include, in response to a determination that the customer's online website navigation includes the at-risk characteristic, transmitting a text chat invitation via the electronic information processing platform to the customer.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
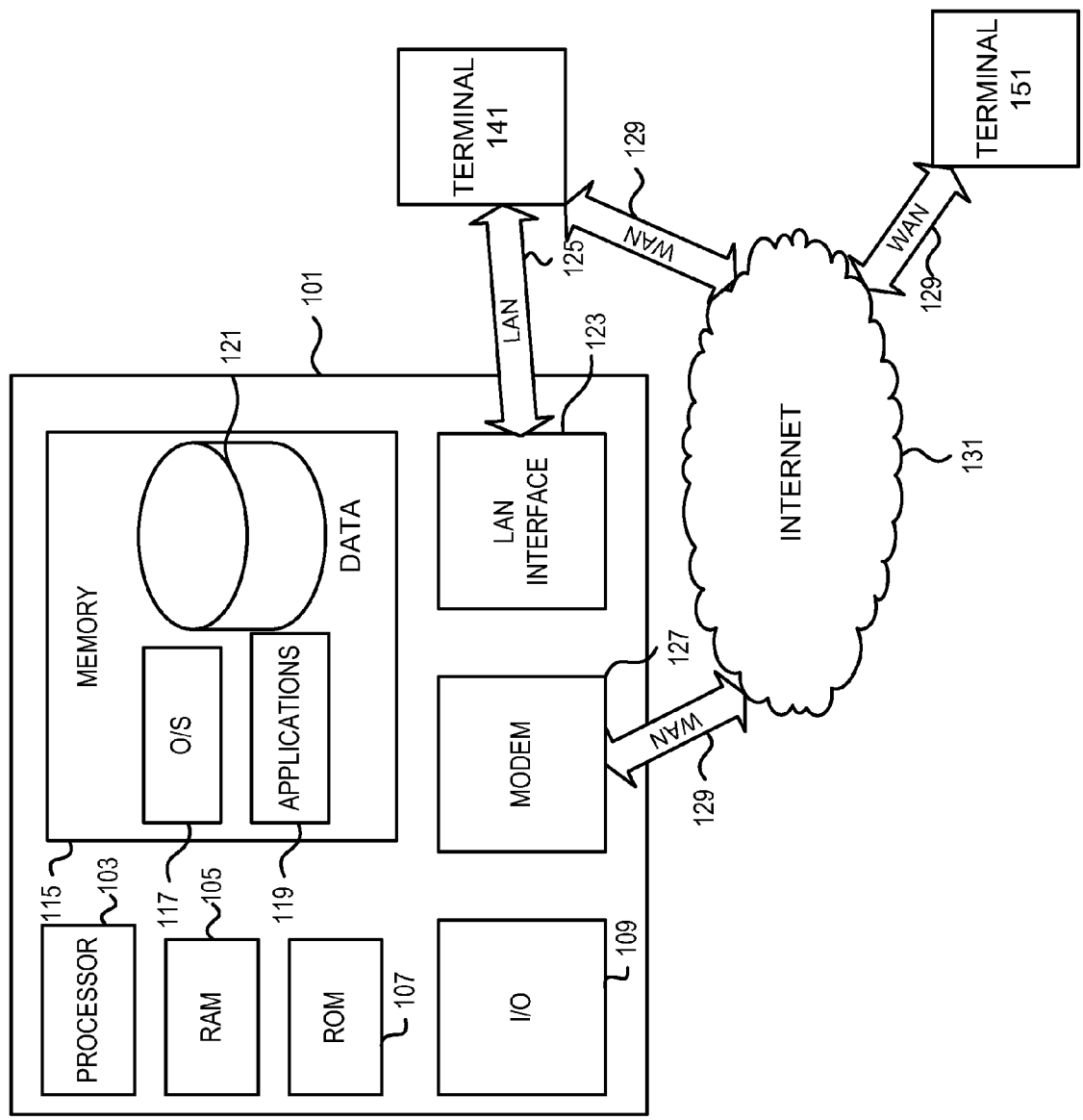
FIG. 1 is a schematic diagram of apparatus that may be used in accordance with the principles of the invention.

Systems and methods for initiating a text chat for at-risk customers, according to the invention, are an extension of a known customer service text chat channel. Such systems and methods may enhance an existing text chat channel by being able to target customers that are at risk of ending their relationship with an entity.

In systems and methods according to the invention, customers that display characteristics or behaviors common to customers who close accounts will proactively receive text chat invitations.

This invention relates to various aspects of initiatives to limit attrition of at-risk entity customers. A first aspect of the invention relates to determining common characteristics or criteria that indicate a customer is likely to close accounts or end their relationship with an entity.

Another aspect of the invention relates to developing a preferably algorithmic "at-risk of attrition" flag. Such a flag can preferably be utilized by the website and chat application for identifying which customer receives a chat invitation.

Such a flag preferably identifies the customer based on the common characteristics and/or criteria of customers who are more likely to be subject to attrition. In addition, such a flag may also be implemented within an overarching structure of business rules that determine where and when the identification of the at-risk customer may be useful.

Yet another aspect of the invention may relate to providing specialized processes to follow when communicating with the at-risk customer.

This invention is intended to proactively engage customers that are likely to attrite. By targeting these at-risk customers, an entity may be able to resolve key customer issues while there is still time to salvage the customer relationship.

In order to implement solutions according to the invention, systems and methods may include several components.

An entity can determine common characteristics or behaviors of customers who are likely to attrite. These characteristics may be related to account levels, certain characteristics of recent account activity—e.g., transferring money out of accounts—, upcoming maturity of accounts—e.g., Mortgages and CDs—, characteristics of recent online activity—e.g., a high number of customer service request emails—, outside the entity value transfers—e.g., transfers from a bank account to an external banking source, search queries related to closing accounts, and any other suitable characteristics related to the customer. In alternative embodiments of the invention, determinations may be based on some combination of the foregoing characteristics or on suitable characteristics not described herein.

Based on the above criteria and information received from transaction systems and databases, the customer information system of record may maintain an at-risk flag with respect to particular customer.

In further embodiments of the invention, a customer can be assigned the flag as the customer logs in. The flag can then be used within chat business rules to determine whether or not to offer a pro-active, unsolicited, text chat invitation to the customer. In alternative embodiments of the invention, the flag can be activated during the online customer's interactive entity session. Accordingly, during any suitable web session, customers who exhibit new online behaviors that are indicative of being at-risk for attrition may also receive the chat invitation.

While the flag could primarily be used for the text chat channel, it could also be displayed in other customer service channels such as on a display suitable for a phone service representative. Alternatively, the flag could be stored to trigger special servicing at a later date or time.

The approach to defining and identifying customers that are likely to attrite may apply across industries. Proactively engaging likely to attrite target customers through chat can be used by any suitable eCommerce company, as well as be installed in any suitable online chat application.

FIG. 1 shows an example of an apparatus upon which processes according to the invention may be implemented.

Figure 2:
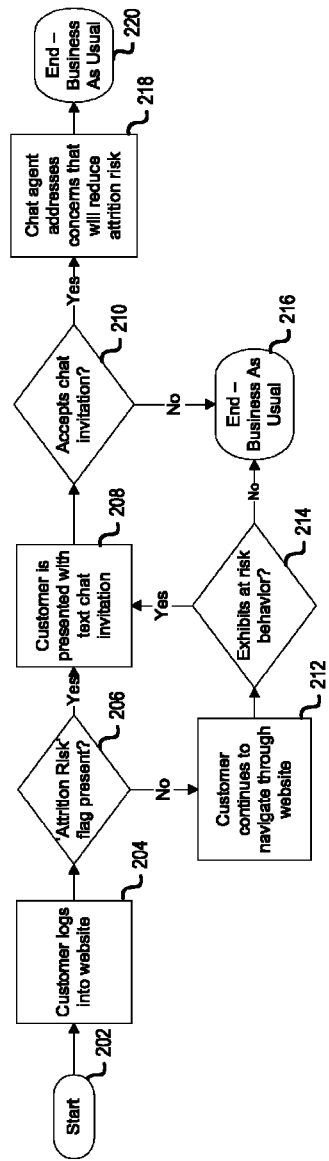
FIG. 2 is a flow diagram of an illustrative process according to the invention.
Figure 3:
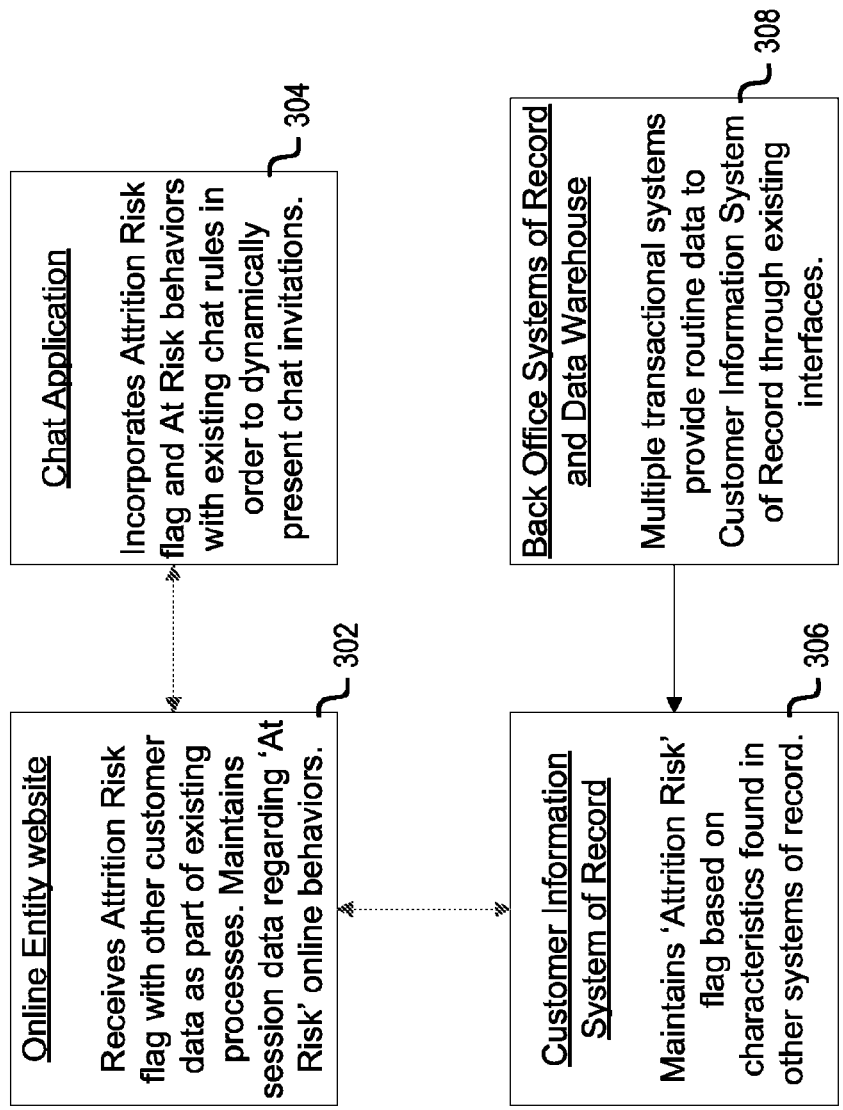
FIG. 3 is an exemplary architecture according to the principles of the invention.

FIGS. 2 and 3 show illustrative embodiments and features of systems and methods according to the invention.

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects.

Furthermore, such aspects may take the form of a computer program product stored by one or more non-transitory computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 is a block diagram that illustrates a generic computing device 101 (alternatively referred to herein as a "server") that may be used according to an illustrative embodiment of the invention. The computer server 101 may have a processor 103 for controlling overall operation of the server and its associated components, including RAM 105, ROM 107, input/output module 109, and memory 115.

Input/output ("I/O") module 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 115 and/or storage to provide instructions to processor 103 for enabling server 101 to perform various functions. For example, memory 115 may store software used by server 101, such as an operating system 117, application programs 119, and an associated database 121. Alternatively, some or all of server 101 computer executable instructions may be embodied in hardware or firmware (not shown). As described in detail below, database 121 may provide storage for criteria for identifying likeliness to attrite, rules for determining whether or not to offer a chat invitation to a customer navigating through the website, and any other suitable information.

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks. When used in a LAN networking environment, computer 101 is connected to LAN 125 through a network interface or adapter 123. When used in a WAN networking environment, server 101 may include a modem 127 or other means for establishing communications over WAN 129, such as Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 119, which may be used by server 101, may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown).

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

FIG. 2 is a flow diagram of an illustrative process according to the invention. The process starts at 202. A customer may log into an entity website at step 204.

The process may query whether an attrition flag is present, as shown at step 206. This query may preferably be implemented on an electronic communication platform, such as the apparatus shown in FIG. 1.

The attrition flag can be set and maintained in a system of record. It can be set when a customer meets criteria that are common to customers who have ended their relationships or closed accounts at the entity.

In certain embodiments of the invention, the attrition flag could be set by reaching threshold levels of characteristics related to account balance levels, recent account activities—e.g., transferring funds out of accounts, upcoming maturing of accounts (mortgage, CD, insurance, etc.), and recent online activity.

If the attrition flag is present—i.e., set, step 208, this indicates that a threshold level of behaviors as described above with respect to step 206 is met. The flag may indicate further that a customer may be presented with text chat invitation. If the customer accepts the chat invitation, as shown at step 210, the entity chat agent may address customer concerns that can reduce attrition risk, as shown at 218.

Preferably, a chat agent may be empowered by an entity to 'make things right' for the customer by correcting critical servicing issues, rewarding customers for their relationships, and/or helping the customer find new product solutions. If the customer does not accept the chat invitation, then the web session can continue and end with a typical termination of the process, as may be found in termination of a "business as usual" web process.

Step 220 shows business as usual following the text encounter.

Step 212 shows that, following a determination that no attrition flag exists with respect to a predetermined customer, the customer may continue to navigate through the website.

Step 214 shows a process query that queries whether the customer, during a web session, exhibits predetermined at-risk behavior as the customer continues to navigate through the website. At-risk behaviors can be customer actions within the website that are common to customers who are likely to attrite. Examples of such behaviors may include search queries regarding "closing an account", transferring funds so that accounts are zero balance, and large transfers from within the entity to outside the entity.

If the customer shows thresholds levels at-risk behavior during the web session, then the customer may be presented with a text chat invitation, at step 208.

If no at-risk behaviors are identified during the current web session, then the process may end at step 216.

FIG. 3 is an exemplary architecture according to the invention. A schematic diagram of an exemplary online entity website is shown at 302. Such a website may include an electronic communications platform for associating an attrition risk flag with other customer data as part of certain at least partially customer-facing processes. Such a platform may further maintain session data regarding 'at-risk' online behaviors.

A chat application 304, which may be resident in a memory such as memory 115 in FIG. 1, may communicate with the website 302. Chat application 304 may incorporate an attrition risk flag and at-risk behaviors with existing chat rules in order to dynamically present chat invitations via the electronic communications platform.

A customer information system of record 306 may also interact with website 302. System 306 may initiate and/or maintain the attrition risk flag based on characteristics found in other systems of record.

A back office system of record and data warehouse is shown at 308. Such a back office and warehouse 308 may preferably support the system of record 306. Such support may include maintaining a database to store various characteristics regarding the customer. System 306 may preferably retrieve such information from back office and data warehouse 308.

Multiple transactional systems, which may form part of back office and data warehouse 308, may further provide routine data to customer information system of record 306 through existing interfaces.

Aspects of the invention have been described in terms of illustrative embodiments thereof. A person having ordinary skill in the art will appreciate that numerous additional embodiments, modifications, and variations may exist that remain within the scope and spirit of the invention.

One of ordinary skill in the art will appreciate that the apparatus features described herein and illustrated in the FIGs. may be arranged in other than the recited configuration and that one or more of the features may be optional. Also, the methods described herein and illustrated in the FIGS. may be performed in other than the recited order and that one or more steps illustrated may be optional. The above-referenced embodiments may involve the use of other additional elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, systems and methods for providing text chat for at-risk customers have been provided. Persons skilled in the art will appreciate that the present invention can be practiced by other than the described embodiments, which are presented for purposes of illustration rather than of limitation, and that the present invention is limited only by the claims that follow.

What is claimed is:

1. One or more non-transitory computer-readable media storing computer-executable instructions which, when executed by a processor on a computer system, perform a method for initiating text chat for at-risk customers, the method using an electronic information processing platform, the method comprising:
   identifying a behavior that indicates whether a customer is at risk to close an account with an entity, the behavior corresponding to a threshold level of at least one of:
      transferring money out of one or more accounts;
   pending maturity of one or more accounts;
   customer service requests;
   internal to external transfers;
   search queries related to closing accounts; or
      customer service request emails;
   monitoring a customer's online website navigation to determine whether the customer's online website navigation includes the identified behavior; and
   in response to a determination that the customer's online website navigation includes the identified behavior, initiating a text chat with the customer;
   wherein:
      the text chat is directed to reducing a risk that the customer will close an account.

2. The media of claim 1 wherein the method further includes implementing the identification of the behavior based on a hierarchy of predetermined rules.

3. The media of claim 1 wherein the method further includes retrieving stored text relating to a customized communication for dealing with an identified customer and/or displaying the text.

4. One or more non-transitory computer-readable media storing computer-executable instructions which, when executed by a processor on a computer system, perform a method for initiating text chat for at-risk customers, the method using an electronic information processing platform, the method comprising:
   monitoring a customer's online website navigation at an entity's website to determine whether the customer's online website navigation exhibits a characteristic indicative of a potential to close an account with the entity, the characteristic corresponding to a threshold level of at least one of:
   transferring money out of one or more accounts;
   pending maturity of one or more accounts;
   customer service requests;
   internal to external transfers;
   search queries related to closing accounts; or
      customer service request emails; and
   in response to a determination that the customer's online website navigation includes the characteristic, initiating a text chat via the electronic information processing platform with the customer;

wherein:

the text chat is directed to reducing a risk that the customer will close an account.

5. The media of claim 4 wherein the method further includes implementing the identification of the behavior based on a hierarchy of predetermined rules.

6. The media of claim 4 wherein the method further includes displaying text relating to a customized communication for dealing with an identified customer.

7. A method for operating an electronic information processing platform, the method comprising:
- receiving, via the electronic information processing platform, information indicating that a customer exhibits behavior indicative of a desire to close an account with an entity, the behavior corresponding to a threshold level of at least one of:
  - transferring money out of one or more accounts;
  - pending maturity of one or more accounts;
  - customer service requests;
  - internal to external transfers;
  - search queries related to closing accounts; or
  - customer service request emails; and
- in response to the received information, transmitting to the customer a text chat invitation via the electronic information processing platform;

wherein:

upon acceptance of the invitation, a text chat is directed to reducing a risk that the customer will close an account.

8. One or more non-transitory computer-readable media storing computer-executable instructions which, when executed by a processor on a computer system, perform a method for initiating text chat for at-risk customers, the method using an electronic information processing platform, the method comprising:
- identifying a behavior that indicates whether a customer is at risk to close an account with an entity, the behavior corresponding to a threshold level of at least one of:
  - transferring money out of one or more accounts;
  - pending maturity of one or more accounts;
  - customer service requests;
  - internal to external transfers;
  - search queries related to closing accounts; or
  - customer service request emails;
- monitoring a customer's online website navigation to determine whether the customer's online website navigation includes the identified behavior; and
- in response to a determination that the customer's online website navigation includes the identified behavior, transmitting a text chat invitation via the electronic information processing platform to a customer based on the monitoring.

* * * * *